United States Patent [19]

Ohtani et al.

[11] Patent Number: 5,030,897
[45] Date of Patent: Jul. 9, 1991

[54] DRIVING CURRENT CONTROL CIRCUIT

[75] Inventors: Kenzi Ohtani; Michihiko Hayashi, both of Kyoto, Japan

[73] Assignee: Rohm Co., Ltd., Japan

[21] Appl. No.: 448,857

[22] Filed: Dec. 12, 1989

[30] Foreign Application Priority Data

Dec. 20, 1988 [JP] Japan ............... 63-165522[U]

[51] Int. Cl.$^5$ ............................................. H20P 7/00
[52] U.S. Cl. .................................. 318/139; 318/254; 318/439
[58] Field of Search ............... 318/439, 808, 431, 139, 318/256, 254, 257

[56] References Cited

U.S. PATENT DOCUMENTS

| | | | |
|---|---|---|---|
| 4,336,562 | 6/1982 | Kotowski | 318/257 |
| 4,415,249 | 11/1983 | Tsuzuki et al. | 318/139 |
| 4,535,276 | 8/1985 | Yokobori | 318/439 |
| 4,633,358 | 12/1986 | Nagano | 318/256 |
| 4,651,067 | 3/1987 | Ito et al. | |
| 4,651,068 | 3/1987 | Meshkat-Razavi | |
| 4,661,766 | 4/1987 | Hoffman et al. | 318/139 |
| 4,686,436 | 8/1987 | Archer | 318/254 |
| 4,746,843 | 5/1988 | Taenzer | |

Primary Examiner—William M. Shoop, Jr.
Assistant Examiner—J. W. Cabeca
Attorney, Agent, or Firm—Oliff & Berridge

[57] ABSTRACT

A driving current control circuit capable of controlling the logarithmic base current of two transistors in a current driver to control a drive current for a motor. This control circuit controls the current of the current regulator depending on a control signal, thereby controlling the driving current for the transistors in the current driver. The control circuit includes an output current mirror composed of two output-side transistors and a single input-side transistor. The two output-side transistors control the inflow and outflow of the driving current for the current driver. A single phase compensating condenser is connected to the input-side transistor. This arrangement makes the entire circuit simple and compact and causes an improved controlling characteristic.

12 Claims, 3 Drawing Sheets

DRIVING CURRENT CONTROL CIRCUIT

BACKGROUND OF THE INVENTION

1. Field of the Invention

This invention relates to a control circuit for controlling a driving current of a current driver in a motor driving circuit, and more particularly to simplification of such a control circuit and improvement of its control characteristics.

2. Description of the Related Art

Heretofore motor drivers of full-wave drive type are known as motor drive circuits. The principles of this type of motor drivers will now be described with reference to FIG. 3 of the accompanying drawings.

In FIG. 3, the rotational position of a motor 10 is detected by a rotational position detector (not shown) such as a hole element. Assuming that a detection of the position is made for example by three hole elements, position detection signals H1, H2, H3 are obtained to be inputted to a drive signal generator 12. This drive signal generator 12 issues signals for changing over the respective current-flow directions of a plurality of coils of the motor depending on the position detection signals H1, H2, H3.

The output signals of the drive signal generator 12 are supplied to a current driver 16, via a driving current control circuit 14, to control a current in each of the coils (e.g., three coils in FIG. 3) of the motor.

FIG. 4 shows a current driver 16 of full-wave drive type, which controls the direction of the current flowing to the respective coil and which is composed of current-limiting elements corresponding one to each coil.

In this illustrated example, the individual current-limiting element comprises a p-n-p transistor 20 and an n-p-n transistor 22 which are interconnected in series. The emitter of the p-n-p transistor 20 is connected to a power source, and the emitter of the n-p-n transistor 22 is connected to the ground; and the junction of the collectors of these two transistors 20, 22 is connected to a respective one of the coils of the motor 10.

When the transistor 20 is rendered conductive, the driving current flows in the coil of the motor 10. When the transistor 22 is rendered conductive, the driving current flows in the coil of the motor 10.

This driving current may be controlled by:
1) controlling only the power-source-side transistor 20;
2) controlling only the ground-side transistor 22; or
3) controlling both the power-source-side transistor 20 and the ground-side transistor 22.

By any of these three ways, it is possible to supply a desired current to the coil of the motor 10.

The motor driving current flow in the current driver 16 is controlled by the driving current control circuit 14. One example of this driving current control circuit 14 will now be described with reference to FIGS. 5A and 5B.

The driving current control circuit 14 includes a driving current controlling circuit 14a for outflow of a base current, and a driving current controlling circuit 14b for inflow of a base current.

The driving current controlling circuit 14a of FIG. 5A is for outflow of the base current of the transistor 20 and is composed of two current mirrors 30, 32. The collectors of a pair of p-n-p transistors 34, 36 of the current mirror 30 are connected to the power source. And a current regulator 38 is interposed between the collector and the ground of the input-side transistor 34.

For instance, the current regulator 38 increases and reduces the current value according to a control signal from the exterior which signal corresponds to the torque command for the motor 10.

The collector of the output-side transistor 36 of the current mirror 30 is connected to the input-side transistor 42 of the current mirror 32 via a resistor 40. The emitter of this transistor 42 is connected to the ground. The emitter and the collector of the output-side transistor 44 of the current mirror 32 are connected to the ground and the terminal $T_1$, respectively.

Consequently, partly since the same amount of current flows to the input-side and output-side transistors 34, 36 of the current mirror 30, and partly since the same amount of current flows to the input-side and output-side transistors 42, 44 of the current mirror 32, a current equal to the amount of current flowing to the current regulator 38 flows in from the terminal $T_1$.

A phase compensating condenser 46 is connected to the junction of the collector of the transistor 36 and the resistor 40. With this phase compensating condenser 46, it is possible to delay the phase of the current flowing in from the terminal $T_1$. In general, the driving current control circuit 14 is an IC form; the phase compensating condenser 46 is large in size, and is therefore attached to the IC via the terminal P.

By controlling the base current of the transistor 20 in the current driver 16 by the driving current controlling circuit 14a, it is possible to control the current flow to the individual coil of the motor 10.

The driving current controlling circuit 14b of FIG. 5B is for supply of the base current of the transistor 22 in the current driver 16. This driving current controlling circuit 14b is identical with the driving current controlling circuit 14a, except that + (plus) and − (minus) are just inverted. Namely, the driving current controlling circuit 14b, like the driving current controlling circuit 14a, is composed of two current mirrors 30, 32, a current regulator 38, a resistor 40 and a phase compensating condenser 46; the power source and the ground, to which these respective parts are connected, are arranged oppositely. Also the junction, i.e., p-n-p or n-p-n of the transistors 34, 36, 42, 44 are opposite. Therefore, from the terminal $T_2$ the base current flows out to each transistor 22 in the current driver 16. Here the current flowing out from this terminal $T_2$ is synchronous with the current flowing in from the terminal $T_1$.

Since the supply of current in the current driver 16 to the motor 10 is controlled, in synchronism with the drive signal, by the driving current control circuit 14, a desired rate of rotation of the motor 10 can be achieved.

However, in the conventional art, the driving current controlling circuit 14a constituting the ground-side circuit of the current driver 16 for inflow of the base current is totally independent from the driving current controlling circuit 14b constituting the power-source-side circuit of the current driver 16 for supply of the base current. For this reason, a phase divergence would occur between the two controlling circuits 14a, 14b. Further, it is very difficult to control the respective currents while maintaining the ratio of the driving currents of the two controlling circuits 14a, 14b.

Furthermore, each of the two driving current controlling circuits 14a, 14b requires one phase compensating condenser 46, i.e., two condensers in total. A condenser is large in size and so is a part not suitable to be incorporated in an IC. Consequently it has been a common demand in the art that the number of the condensers could be minimized.

SUMMARY OF THE INVENTION

It is therefore an object of this invention to provide a driving current control circuit capable of effectively supplying a current from a current driver to a motor, requiring only one phase compensating condenser.

According to this invention, there is provided a driving control circuit for controlling a driving current to a current driver which controls the supply of the driving current to a motor.

With the control circuit thus constructed, the base current in the current driver to control the current for the motor can be driven based on the output of one output current mirror, thus avoiding any phase divergence in the current driver. Only one phase compensating condenser is required to be located at the signal-supply-side of the output current mirror, thus making the entire circuit compact.

DETAILED DESCRIPTION

Figure 1:
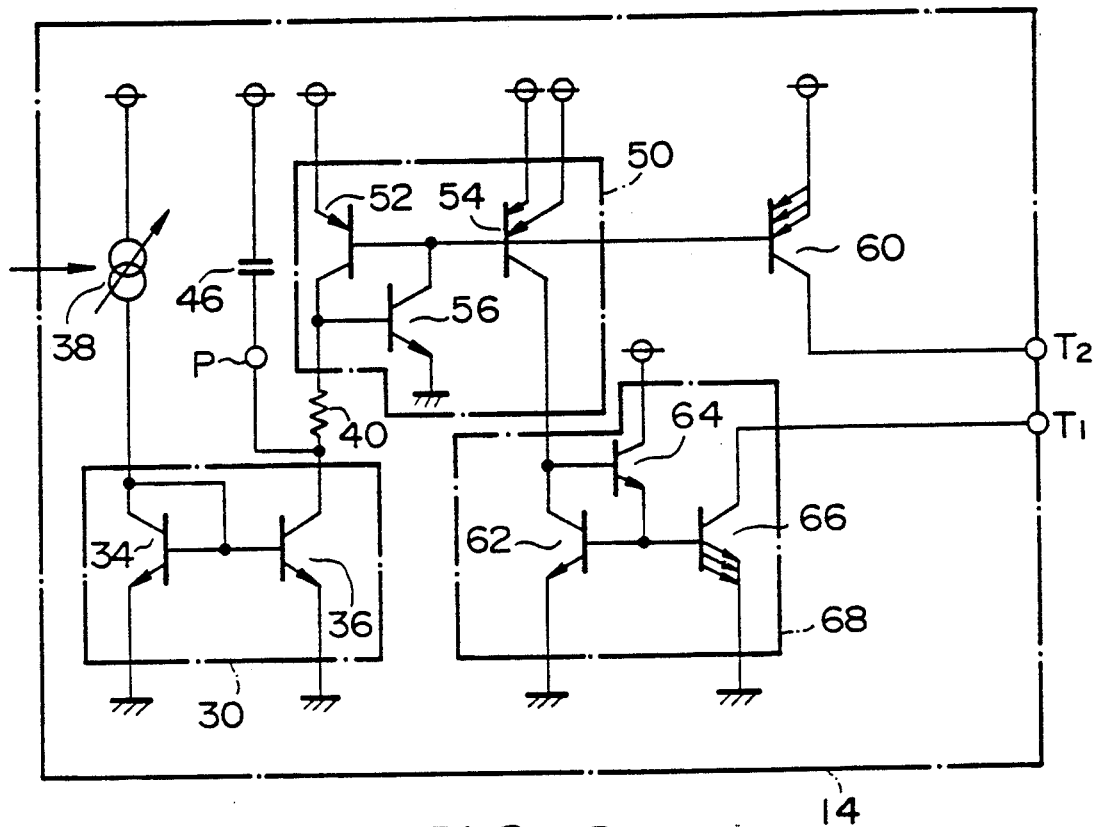
FIG. 1 is a circuit diagram showing a driving current control circuit embodying this invention.

The principles of this invention are particularly useful when embodied in a driving current control circuit such as shown in FIG. 1, generally designated by the numeral 14.

Figure 5A:
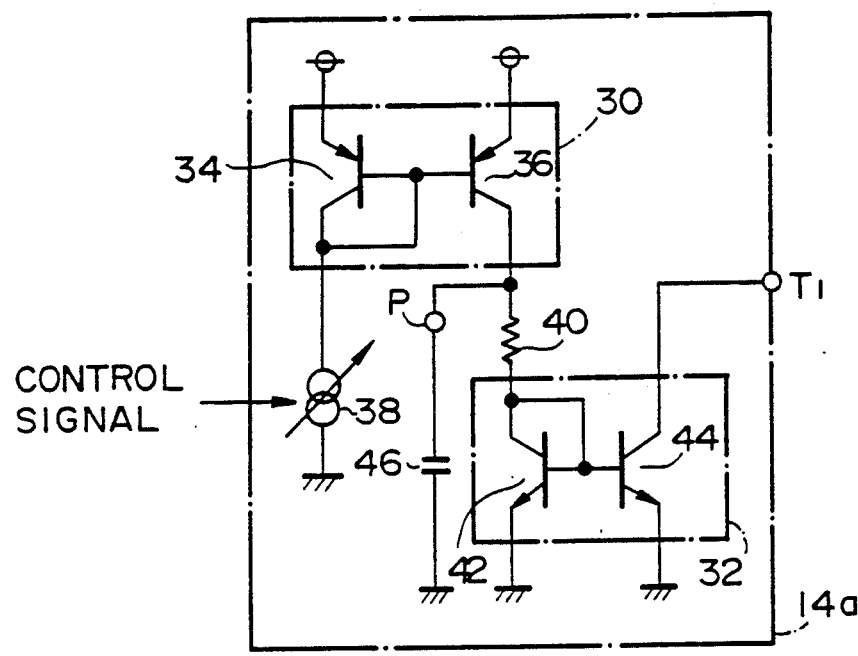
FIGS. 5A and 5B are circuit diagrams showing a conventional driving current control circuit.
Figure 5B:
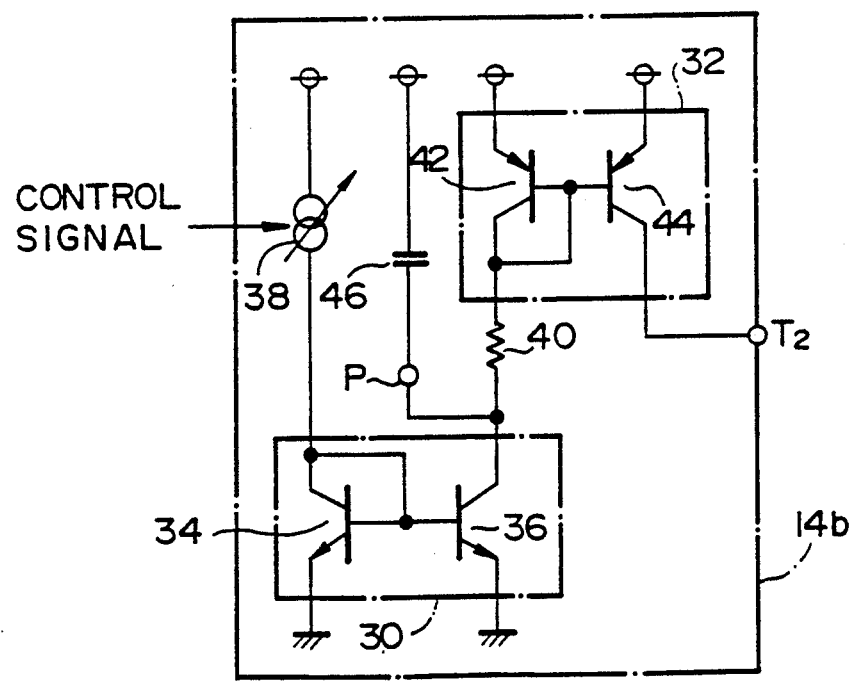

In FIG. 1, a current regulator 38 renders a current to flow in proportion to a torque signal, namely, an input control signal from the exterior. The current regulator 38, like the conventional control circuit of FIG. 5B, is connected to an input side current mirror composed of transistors 34, 36. The same current as in the current regulator 38 flows in the transistor 36.

To the collector of the transistor 36, an output current mirror 50 is connected via a resistor 40, and a phase compensating condenser 46 also is connected. The output current mirror 50 is composed of three transistors 52, 54, 56. The emitters of the transistors 52, 54 are connected to a power source, and their bases are connected to each other. The transistor 56 serving as a buffer is connected at the collector to the bases of the transistors 52, 54, at the emitter to the ground and at the base to the collector of the transistor 52. A current flows to the transistor 54 depending on the current flowing to the transistor 52. In this example, the emitter area of the transistor 54 is twice the emitter area of the transistor 52; that is, the amount of current flowing to the transistor 54 is twice the amount of current flow to the transistor 52. The buffer transistor 56 serves to assist in improving the precision of the output current mirror 50.

To a common base end of the transistors 52, 54 of the output current mirror 50, the base of a first current driving transistor 60 comprising a p-n-p transistor is connected. The first current driving transistor 60 is connected at the emitter to the power source and at the collector to the terminal $T_2$ for connection with a current driver 16. Therefore, the current to flow to the first current driving transistor 60 can be outputted from the terminal $T_2$. The current to flow the first current driving transistor 60 can be adjusted by varying the emitter area of the first current driving transistor 60. In this example, since the emitter area of the transistor 60 is triple the emitter area of the transistor 52, the amount of current flowing to the transistor 60 is triple the amount of current flow to the transistor 52.

Further, to the collector of the output-side transistor 54 of the output current mirror 50, the collector of a transistor 62 is connected. This transistor 62, a buffer transistor 64 and a second current driving transistor 66 jointly constitute an output-side additional current mirror 68. Specifically, the emitter of the transistor 62 is connected to the ground, while the buffer transistor 64 is connected at the collector to the power source, at the emitter to the bases of the transistors 62, 66 and at the base to the collector of the transistor 62.

The second current driving transistor 66 is connected at the emitter to the ground and at the collector to the terminal $T_1$. Therefore, the current flows to the second current driving transistor 66 depending on the current flowing to the transistor 62 and then flows in to the current driver 16 from the terminal $T_1$. The emitter area of the second current driving transistor 66 is triple the emitter area of the transistor 62.

Figure 3:
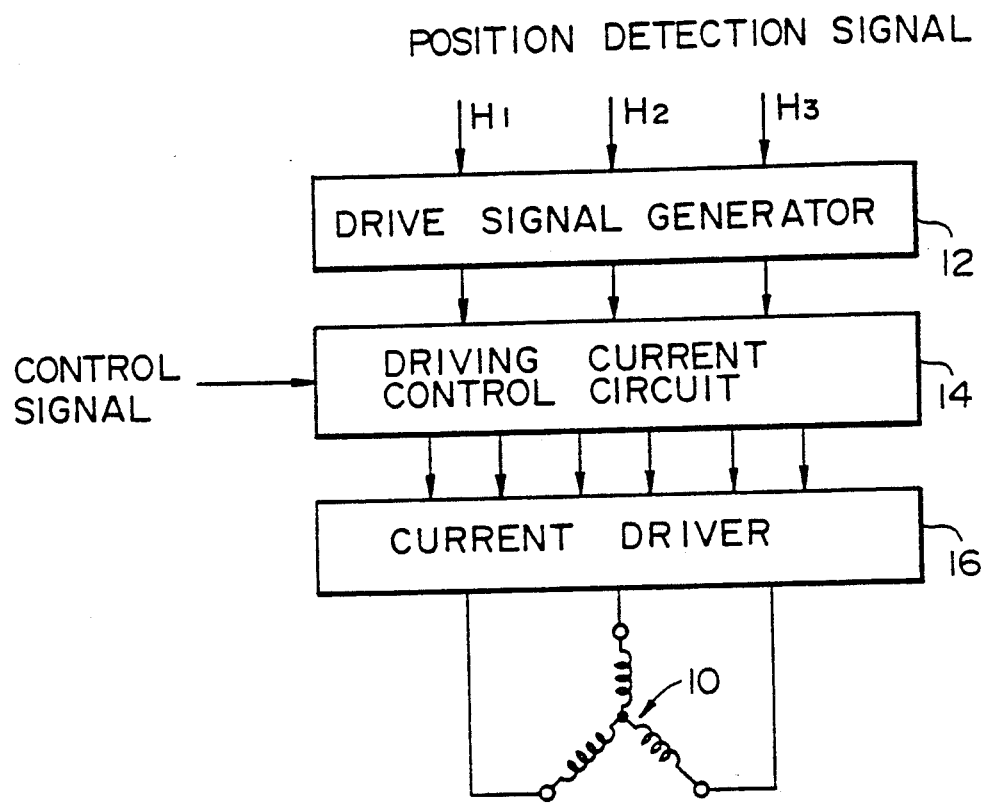
FIG. 3 is a block diagram showing a motor driving circuit.
Figure 4:
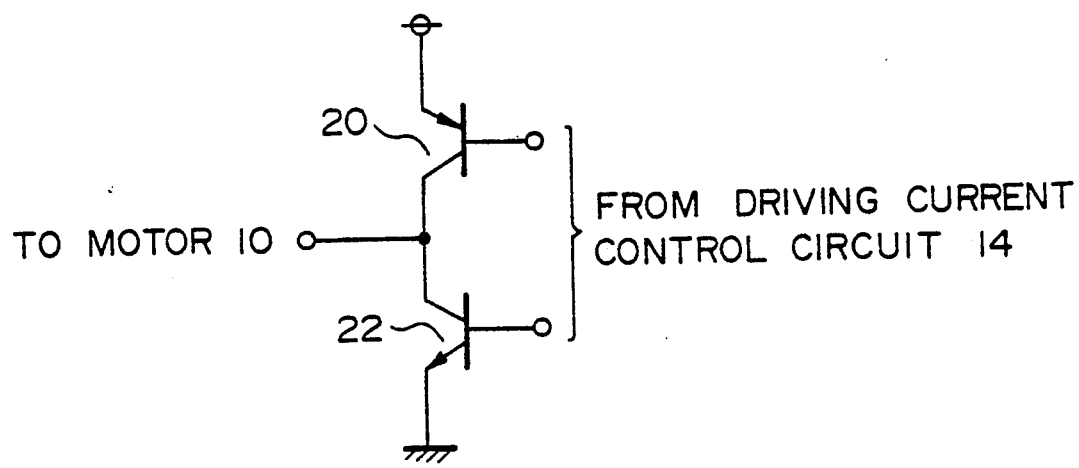
FIG. 4 is a circuit diagram showing a current driver.

Consequently, as the current at the current regulator 38 is controlled by the control signal, the current flows out from the terminal $T_2$, and the current flows in from the terminal $T_1$. These terminals $T_1$, $T_2$ are connected to the current driver 16 of FIG. 3 so that the driving current is controlled at either the power-source side or the ground side.

For a significant feature of this invention, a phase compensating condenser 46 is connected to the supply side of the output current mirror 50. Using the current after having been adjusted in phase, the current flowing to the first and second current driving transistors 60, 66 is controlled. By inputting a single control signal, it is possible to control the inflow and outflow of the current at the current driver 16. Since only a single condenser is required, the entire circuit can be reduced to a compact size. Further, the amount of current flow can be adjusted without causing any phase divergence between the inflow and outflow of the current at the current driver 16 and also without giving any influence to the phase due to the characteristics of the first and second current driving transistors 60, 66.

For varying the current communication in the motor 10 at a predetermined phase, a plurality of the current drivers 16 must be energized and deenergized successively. For this purpose, the terminals $T_1$, $T_2$ of the driving current control circuit 14 may be connected to the bases of the transistors 20, 22 in the current driver 16 of FIG. 3 not directly, i.e., via control transistors to be energized or deenergized by other control signals. With this arrangement, the terminals $T_1$, $T_2$ of one driving current control circuit can be connected respectively to the transistors of the plural current drivers 16 via their control. By energizing and deenergizing the plural transistors successively in a predetermined order, the base current can be rendered to flow the plural current drivers one after another, using a single driving current control circuit.

Figure 2:
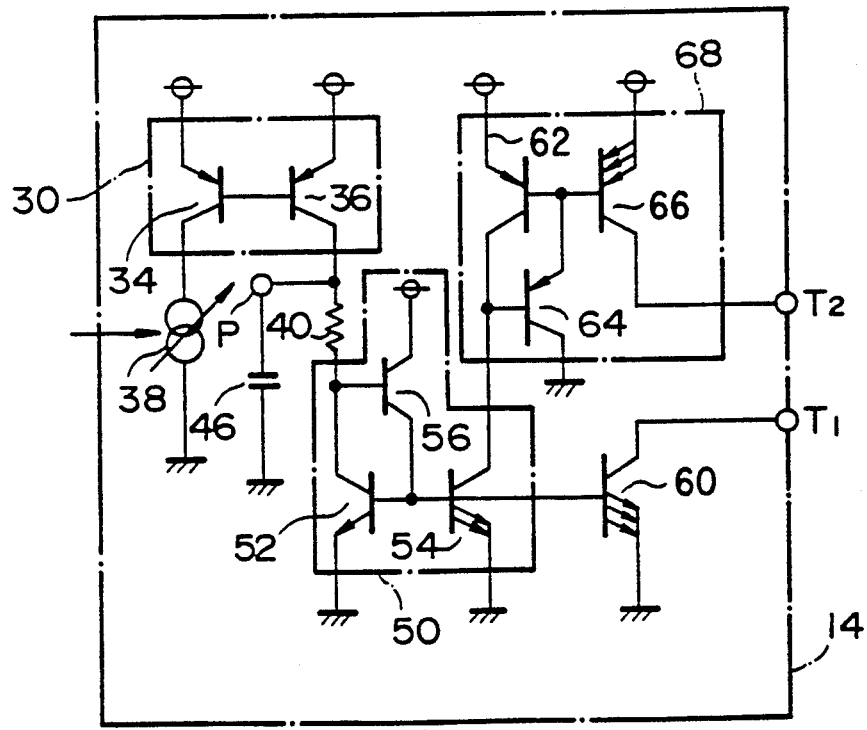
FIG. 2 is a modification of the control circuit of FIG. 1.

FIG. 2 shows a modification of the driving current control circuit according to another embodiment of this invention. This circuit is substantially equivalent to the circuit of FIG. 1, except that + (plus) and − (minus) are inverted. Namely, the power-source-side and the ground-side of the circuit are reversed, and also the junction, i.e., n-p-n or p-n-p of the individual transistor is reversed.

The driving current control circuit of this invention requires only one phase compensating condenser so that the entire circuit can be reduced to a compact size. It is also possible to eliminate any phase divergence of the base current in the current driver.

What is claimed is:

1. A driving control circuit comprising:
    a current regulator for regulating a current to flow in proportion to an input control signal;
    an input-side current mirror having a first transistor which receives said regulated current;
    an output current mirror connected to said first transistor, said output current mirror having a second transistor whose base directly connects to the base of a third transistor, said second and third transistors being of a different polarity type than said first transistor;
    a current driving transistor whose base connects to the base of said second transistor and to the base of said third transistor, said current driving transistor being of the same polarity type as said second and third transistors; and
    a second output current mirror connected to the collector of said third transistor, said second output current mirror having a fourth transistor of the same polarity type as said first transistor, the base of said fourth transistor being connected the base of a second current driving transistor of the same polarity type as said fourth transistor.

2. A circuit according to claim 1, wherein:
    the emitters of said driving transistor, said second transistor, and said third transistor are connected to a power source.

3. A circuit according to claim 1, wherein:
    the emitters of said driving transistors, said second transistor and third transistor are connected to ground.

4. A circuit according to claim 1, wherein:
    current flow through said third transistor is proportional to current flow through said second transistor resulting from said second transistor having an emitter area proportional to an emitter area of said third transistor.

5. A circuit according to claim 4, wherein:
    current flow through said driving transistor is proportional to current flow through said second transistor resulting from said second transistor having an emitter area proportional to an emitter area of said driving transistor.

6. A circuit according to claim 5, wherein:
    a compensating condenser connects to the collectors of said first transistor and said second transistor.

7. A circuit according to claim 1, wherein:
    current flow through said fourth transistor is proportional to current flow through said second current driving transistor resulting from said fourth transistor having an emitter area proportional to an emitter area of said second current driving transistor.

8. A circuit according to claim 1, wherein said output current mirror further comprises:
    a first buffer transistor of the same polarity type as said first transistor, the base of said first buffer transistor connected to the collector of said first transistor, and the collector of said buffer transistor connected to the base of said second transistor and to the base of said third transistor.

9. A circuit according to claim 1, wherein said second output current mirror further comprises:
    a second buffer transistor of the same polarity type as said fourth transistor, the emitter of said second buffer transistor connected to the base of said fourth transistor.

10. A circuit according to claim 2, wherein:
    said driving control circuit is connected to a current driver and the inflow and outflow of driving current at said driving control circuit is controlled by said first and second transistors.

11. A circuit according to claim 1, wherein the driving control circuit is connected to a current driver which is connected to an electrical motor.

12. A circuit according to claim 8, further comprising:
    a single capacitor connected between said first transistor and said first buffer transistor.

* * * * *